Dec. 17, 1968 R. S. BODY ET AL 3,417,190

ELECTRIC CABLES

Filed Nov. 28, 1966

3,417,190

ELECTRIC CABLES

Richard Sidney Body, Kent, Donald John Skipper, Isleworth, and John Alan Macdonnell Gibbons, Woking, England, assignors to Associated Electrical Industries Limited, London, England, a British company Filed Nov. 28, 1966, Ser. No. 597,391
Claims priority, application Great Britain, Dec. 3, 1965, 51,420/65
5 Claims. (Cl. 174—36)

ABSTRACT OF THE DISCLOSURE

Electric cable of the gas-filled type, particularly for 132 kv. and above, having a conductor screen or dielectric screen which includes a conductive layer provided in the form of tape having at least one edge which could have given rise to a concentration of electric stress in insulating gas in contact therewith, wherein such edge is overlapped by composite tape consisting of a layer or film of conductive material bonded at least at its edges to one side of a layer of insulating material which overreaches these edges, this conductive layer or film overlapping said edge of the first-mentioned tape and being in electrical contact with the first-mentioned layer so as to constitute part of the screen. Various forms of, and materials for, the composite tape, the rest of the screen and adjacent insulation are described with particular reference to the problem of differential thermal expansion and consequent electrical stress-raising effects which have been found to occur in known cables with lapped high-density polythene insulation.

The invention relates to electric cables and, more particularly, to electrostatic screens provided in gas-filled cables which may be operated at power-system voltages of 132 kv. and above.

In gas-pressurised cable incorporating lapped high-density polythene insulation and a conductor screen of conventional construction consisting of a number of layers (typically three) of lapped, conductive, high-density polythene tape which are overlapped by layers of polythene tape forming the insulation, serious electrical stress-raising effects occur at the edges of the conductive polythene tape forming the outer layer of the screen, when a power-system voltage is impressed upon the cable and the conductor is at an elevated temperature. Since such stress-raising effects are not evident with the cable conductor at ambient temperature it is concluded that the observed phenomenon is associated with movement of the inner layer of the insulation away from the outer layer of the conductive screen when the conductor of the cable is heated, due to the difference between the temperature coefficients of thermal linear expansion of the materials constituting the two layers, for instance unloaded polythene for the insulating layers and polythene loaded with sufficient carbon black to render it electrically conductive for the screen layers. In this latter connection it has been found for example that the addition of 25% by weight of carbon black to high-density polythene reduces the temperature coefficient of thermal cubical expansion by approximately 20%. Local separation of the edge of the outer conductive tape from the inner insulating layer could also occur, for example, as a result of creasing or wrinkling of the tapes produced by mechanical flexing of the cable.

In order to prevent the edges of the outer screening tape causing local stress enhancement and originating discharges in the compressed gas filling, a number of possible approaches may be considered.

The edges of conductive tape could be eliminated simply by using an extruded layer of conductive high-density polythene on the conductor to provide the electrostatic screen. If a sufficiently smooth surface could be obtained by this means there is no reason why some separation of the insulating layers from the screen, due to differential thermal expansion, should not be tolerated. However, in practice great care would need to be taken in order to avoid any irregularities which might act as local stress-raisers and in dealing with discontinuities in this conductive layer at joints. Additionally, a thin extruded layer of insulating polythene applied over and intimately bonded to the conductive layer by known multiple extrusion techniques could be used to mitigate the effects of any surface roughness of the conductive layer, but difficulties may still arise in preserving the continuity of such a screen at joints. A general practical disadvantage of employing an extruded conductor screen in a gas-pressurised lapped polythene cable, or in other proposed forms of gas-insulated cable which would otherwise rely upon lapping or laying up operations for their manufacture, is that an additional production process is required involving extra handling and cost.

Another approach is the use of conductive tapes with a temperature coefficient of thermal linear expansion exactly matching that of the insulating tapes. Since the incorporation of carbon black in sufficient quantity to render polythene electrically conductive significantly reduces the expansion, it would be necessary to load a material which itself possessed a temperature coefficient of thermal linear expansion appreciably higher than that of insulating polythene. An alternative approach would be to use for the first few insulating layers a material which matched, or (perhaps more conveniently) could be matched by, a suitably loaded conductive polythene, on the basis that gaps between layers due to differential thermal expansion can be tolerated provided that these do not occur at an interface between screen and insulation. Certain difficulties are presented in following either of these courses: these is no obviously suitable material with a temperature coefficient of thermal linear expansion greater than that of polythene; with dissimilar materials it may not be possible to get an exact match over the entire temperature range required and any large differences in mechanical characteristics of screening and insulating materials may be undesirable. The effect of using insulating and conductive polythene tapes with matching thermal expansion characteristics may be obtained by applying, between conductive and insulating layers of polythene tape applied with butt gaps in the normal fashion, a relatively thick tape of insulating polythene intercalated (i.e. applied together in partly overlapping relationship) with a thinner tape of conductive polythene. The movement of the edge of the intercalated conductive tape presented to the main dielectric would be controlled by the thermal expansion of the underlaying tape of insulating polythene and thus the edge would be maintained in contact with the innermost layer of insulating tape proper under all temperature conditions. However, a serious drawback of such methods based on matching temperature coefficients of thermal linear expansion by appropriate choice of insulating and conductive materials, or by the use of intercalated constructions, is that any separation produced by agencies other than a rise in temperature, as for example by creasing or wrinkling of the tapes due to mechanical bending, would not be catered for.

In an improved construction according to the present invention, an electric cable of the gas-filled type has an electrostatic screen which includes a conductive layer provided in the form of tape having at least one edge which could have given rise to a concentration of electric stress in insulating gas in contact therewith, wherein such edge is overlapped by composite tape consisting of a layer or film of conductive material bonded at least at its edges to one side of a layer of insulating material which overreaches these edges, said conductive layer or film overlapping said edge of the firstmentioned tape and being in electrical contact with firstmentioned layer so as in effect to constitute part of the screen.

It will be appreciated that, in addition to being applicable to cables of the kind under consideration in the foregoing discussion, the invention is more widely applicable to cables in which the provision of such composite tape in the manner referred to would avoid such concentration of electric stress at the edge of tape in an electrostatic screen. In particular, it is applicable where such electrostatic screen is applied around the insulation of one or more cores incorporated in the cable, to ensure that the electrical field surrounding the conductor of such core is substantially radial, as well as where it is a conductor screen.

In order that the invention may be more fully understood, reference will now be made by way of example to the accompanying drawings in which.

Figure 1:
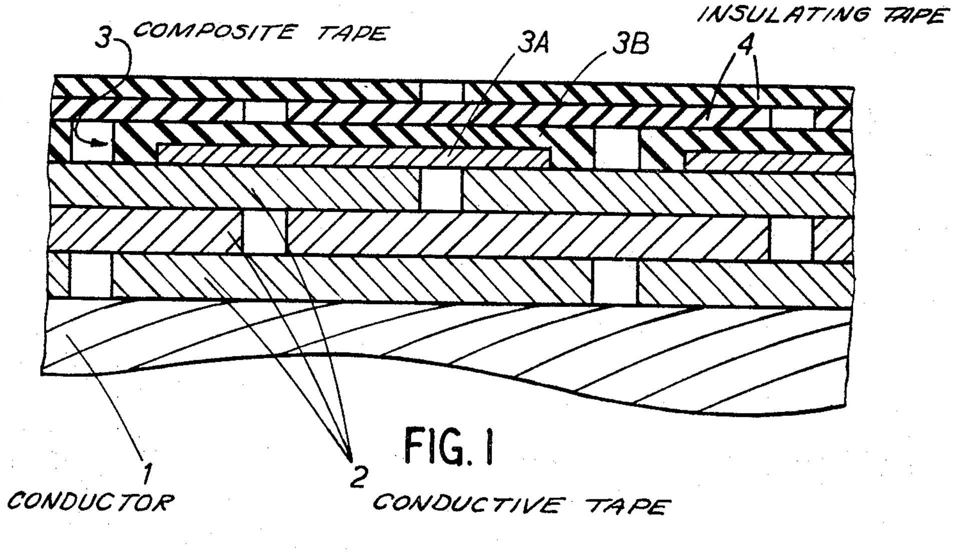
FIG. 1 is a fragmentary longitudinal cross-section of a cable core in accordance with the invention.
Figure 2:
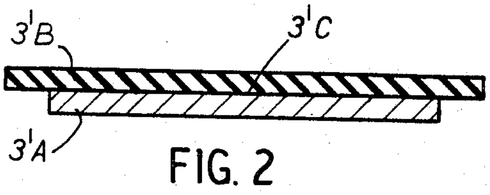
FIG. 2 is a transverse cross-section of an alternative form of composite tape which may be employed in place of a composite tape shown in FIG. 1.

In the arrangement shown in FIG. 1, conductive polythene tapes 2 are lapped on to a conductor 1 in the usual manner, with butt gaps between turns in each layer; a composite tape 3 with a portion of conductive polythene 3A inset into insulating polythene 3B is then applied to overlap the butt gaps in the underlying layer of conductive tape and this is followed by layers of polythene tape 4 forming the insulation. The composite tape shown in FIG. 1 may be unnecessarily elaborate and the simpler form shown in FIG. 2 is considered to be adequate for the purpose. This could, for example, be fabricated by passing together a tape 3'B of insulating polythene and a narrower tape 3'A of conductive polythene between rollers, their facing surfaces 3'C being heated locally (i.e. along a short length of the tapes, at least in the vicinity of the edges of the conductive tape, or more conveniently, across the full width of the tape but along a short length of it), immediately prior to being gripped in the rollers so that sufficient flow of the polymer occurs to weld the two tapes together but without distortion. Alternatively such a tape could be produced by impulse sealing the two edges of the conductive tape to the insulating tape.

Both constructions of composite tape suggested above require the manufacture of individual tapes: a further simplification may be brought about by cutting the composite tape from a two-ply film (which may be produced by slit extrusion or by extruding a relatively thick-walled two-ply tubing and expanding it to form layflat tubing) and relying upon the cutting action of knives (which may possibly be heated) to roll the insulating portion over the edges of the conductive portion when the film is slit into tape.

As an alternative to the form of composite tape 3 illustrated in FIG. 1 and described in relation thereto, a metallised tape with the metallising removed or omitted for a certain distance from each edge may be used. The metallising could be applied, for example, by vacuum deposition of aluminium directly on to a suitable thermoplastic tape or film to which the metal can be adequately bonded (for example, of polypropylene, polyethylene terephthalate, polycarbonate or polystyrene); an alternative, using polythene which may be more convenient but to which the metal cannot be adequately bonded, is to build up a composite tape of a thin metallised nylon, polypropylene, polycarbonate, polystyrene or polyester tape and a wider and thicker polythene tape to produce the desired configuration and resultant temperature coefficient of thermal linear expansion. In such a composite tape the polythene is preferably sandwiched between such metallised tape and a similar thin but unmetallised tape, so as to prevent curling of the laminate; only thin layers of the bonding material can be used if the thermal expansion of the laminate is to match that of high-density polythene insulation. The use of metallised tapes for screening purposes in gas-pressurised lapped polythene cables is not generally favoured because discharges in screen-adjacent butt spaces produced by transient over-voltages would erode the thin metallised layer and might eventually destroy the screen at certain points; however, with a metallised tape used as the composite layer 3 in FIG. 1 there is no possibility of discharges impinging on the thin metallised layer as the adjacent gas will not be electrically stressed.

It may be advantageous, particularly where the composite tape 3 is a metallised tape, to employ a construction in which the first few layers (such as 4) of adjacent insulation are of the same material as the insulating layer of the composite tape but different from the material used in the bulk of the insulating wall. Thus, for example, with a composite tape of metallised polyethylene terephthalate and with the adjacent layers of polyethylene terephthalate the temperature coefficients of thermal linear expansion of these layers will be almost identical but lower than that of high-density polythene which may form the bulk of the insulation. As previously mentioned, gaps between layers of insulation may be tolerated provided that these occur remote from the interface between conductive screen and insulation. In such a construction the conductive screen (such as 2) may be of loaded high-density polythene or possibly, for better matching of temperature coefficients, of metallised tape of material similar to that of the composite tape but metallised on both sides: in the latter case the composite layer is preferably formed by intercalating two composite tapes so as to cover the whole of the metallised outer surface of the adjacent conductive layer of the screen, thereby maintaining conductivity radially through the screening system to a position beyond that surface.

Composite screening tapes of the forms described may also be used to advantage in other gas-filled cable systems such, for instance, as those described in British Patent No. 967,012 and for dielectric or core screening as well as conductor screening.

Figure 3:
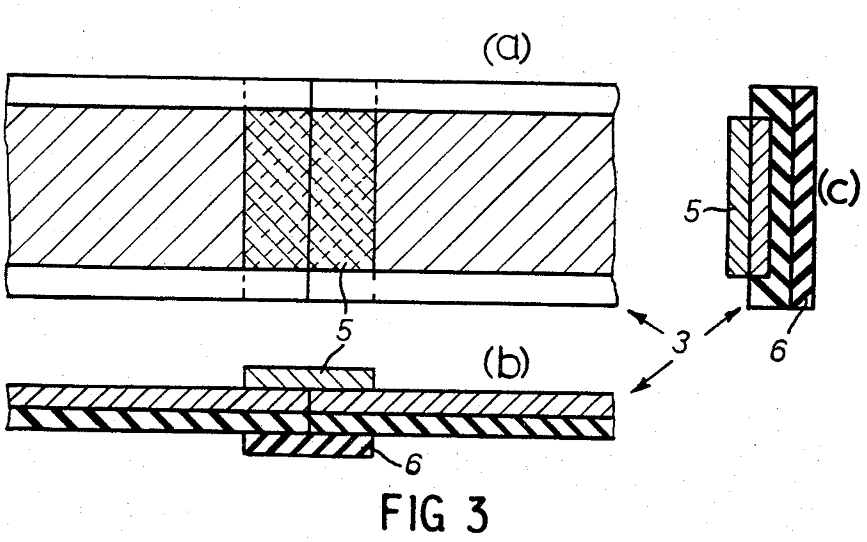
FIG. 3 comprises (a) a fragmentary plan view, (b) a fragmentary logntudinal cross-section and (c) a transverse cross-section of a joint in a composite tape of the form shown in FIG. 1.

In any screen constructions embodying composite tapes it is clearly desirable to ensure that in jointing such tapes any edges of the conductive portion are not exposed at the joint but remain in intimate contact with the insulating portion. A possible method of joining the composite tape comprising part of the screen construction shown in FIG. 1 which meets the above requirements is illustrated in FIG. 3. The ends of the composite tape 3 are butted against each other, and short lengths of conductive 5 and insulating 6 polythene tapes of the appropriate widths are arranged to overlap the joint and are heat-sealed to the underlying tapes by means of impulse sealers. Instead of the joint in the conductive tape 5 being coincident with that in the insulating tape 6, these joints may with advantage be staggered relatively to each other lengthwise of the tape.

What we claim is:

1. An electric cable of the gas-filled type having an electrostatic screen which includes a conductive layer provided in the form of conductive tape having at least one edge which is exposed to an adjacent layer of tape situated between said conductive layer and thermoplastic insulating material of the cable, wherein said edge is overlapped by a composite tape constituting said adjacent layer and comprising a conductive thermoplastic material so inset into and along one side of a wider portion of insulating thermoplastic material that the composite tape presents to the first-mentioned conductive layer a substantially continuous surface of conductive material and flanking insulating material, the conductive layer of the composite tape overlapping said edge of the first-mentioned tape and being in electrical contact with the first-mentioned layer so as in effect to constitute part of the screen.

2. An electric cable of the gas-filled type having an electrostatic screen which includes a conductive layer provided in the form of conductive tape having at least one edge which is exposed to an adjacent layer of tape situated between said conductive layer and thermoplastic insulating material of the cable, wherein said edge is overlapped by a composite tape constituting said adjacent layer and comprising a conductive thermoplastic tape bonded at least at its edges to one side of a wider insulating thermoplastic tape, the conductive layer of the composite tape overlapping said edge of the first-mentioned tape and being in electrical contact with the first-mentioned layer so as in effect to constitute part of the screen.

3. An electric cable of the gas-filled type having an electrostatic screen which includes a conductive layer provided in the form of conductive tape having at least one edge which is exposed to an adjacent layer of tape situated between said conductive layer and thermoplastic insulating material of the cable, wherein said edge is overlapped by a composite tape constituting said adjacent layer and comprising a two-ply thermoplastic film of which one ply is insulating and the other is conductive, the edges of the insulating portion being rolled over the edges of the conductive portion as by the cutting action of knives used to slit a sheet of such film into tape, the conductive layer of the composite tape overlapping said edge of the first-mentioned tape and being in electrical contact with the first-mentioned layer so as in effect to constitute part of the screen.

4. An electric cable of the gas-filled type having an electrostatic screen which includes a conductive layer provided in the form of conductive tape having at least one edge which is exposed to an adjacent layer of tape situated between said conductive layer and thermoplastic insulating material of the cable, wherein said edge is overlapped by a composite tape constituting said adjacent layer and built up of a thin metallised nylon, polypropylene polycarbonate, polystyrene or polyester tape and a wider and thicker polythene tape, the conductive layer of the composite tape overlapping said edge of the first-mentioned tape and being in electrical contact with the first-mentioned layer so as in effect to constitute part of the screen.

5. A cable as claimed in claim 4 wherein the rest of the electrostatic screen is of metallised tape of material similar to that of the composite tape but metallised on both sides.

References Cited

UNITED STATES PATENTS

| | | | |
|---|---|---|---|
| 2,834,828 | 4/1958 | Ebel. | |
| 3,090,825 | 4/1963 | Volk | 174—36 X |
| 3,105,872 | 10/1963 | Thompson et al. | 174—25 X |
| 3,312,774 | 4/1967 | Peterson. | |

FOREIGN PATENTS

| | | |
|---|---|---|
| 541,122 | 11/1952 | Canada. |

LEWIS H. MYERS, *Primary Examiner.*

E. GOLDBERG, *Assistant Examiner.*

U.S. Cl. X.R.

174—25, 127, 106